(12) United States Patent  
Sarchi et al.

(10) Patent No.: US 8,184,980 B2
(45) Date of Patent: May 22, 2012

(54) METHOD AND SYSTEM FOR FIBER-OPTIC MONITORING OF SPATIALLY DISTRIBUTED COMPONENTS

(75) Inventors: Davide Sarchi, Milan (IT); Roberto Gaspari, Milan (IT); Giacomo Coletta, Milan (IT); Giovanni Villani, Milan (IT)

(73) Assignee: Prysmian S.p.A., Milan (IT)

( * ) Notice: Subject to any disclaimer, the term of this patent is extended or adjusted under 35 U.S.C. 154(b) by 339 days.

(21) Appl. No.: 12/312,599

(22) PCT Filed: Nov. 24, 2006

(86) PCT No.: PCT/EP2006/068899
§ 371 (c)(1),
(2), (4) Date: Dec. 18, 2009

(87) PCT Pub. No.: WO2008/061568
PCT Pub. Date: May 29, 2008

(65) Prior Publication Data
US 2010/0092182 A1    Apr. 15, 2010

(51) Int. Cl.
*H04B 10/08* (2006.01)
(52) U.S. Cl. ........ 398/108; 398/113; 398/169; 356/73.1
(58) Field of Classification Search .......... 398/107–108, 398/110, 113, 168–170; 356/73.1
See application file for complete search history.

(56) References Cited

U.S. PATENT DOCUMENTS

| 5,035,511 A | 7/1991 | Berthold |
| 2004/0090312 A1 | 5/2004 | Manis et al. |
| 2004/0113757 A1 | 6/2004 | White, II et al. |
| 2004/0240769 A1 | 12/2004 | Spirin et al. |

FOREIGN PATENT DOCUMENTS

| JP | 3-231116 | 10/1991 |
| JP | 4-92523 | 3/1992 |
| JP | 2004-309219 | 11/2004 |

*Primary Examiner* — Leslie Pascal
(74) *Attorney, Agent, or Firm* — Finnegan, Henderson, Farabow, Garrett & Dunner, L.L.P.

(57) ABSTRACT

A system for monitoring ancillary elements of an electric power distribution network, includes an optical fiber path associated with the ancillary elements to be monitored, respective optical branches branching from the optical fiber path, wherein each optical branch includes at least one passive optical attenuator operatively coupled to, and having an attenuation adapted to change in response to a change in operating conditions of the respective ancillary element, and an optical reflector; an optical radiation source adapted to inject optical radiation into the optical fiber path; and an optical receiver adapted to detect back-reflected optical radiation reflected by the optical reflector; the monitoring system being further adapted to recognize a position of at least one of the ancillary elements based on a characteristic of the back-reflected optical radiation.

21 Claims, 5 Drawing Sheets

METHOD AND SYSTEM FOR FIBER-OPTIC MONITORING OF SPATIALLY DISTRIBUTED COMPONENTS

CROSS REFERENCE TO RELATED APPLICATION

This application is a national phase application based on PCT/EP2006/068899, filed Nov. 24, 2006, the content of which is incorporated herein by reference.

BACKGROUND OF THE INVENTION

1. Field of the Invention

The present invention generally relates to methods and systems for monitoring electric power distribution system components distributed in a plurality of locations. In particular, the invention concerns the monitoring, in real time and by exploiting optical fibers, of the state and condition of "ancillary" elements, for example protection elements used in electric power distribution systems for ensuring the system security.

2. Description of Related Art

Distribution systems of electric power comprise distribution networks, for example high voltage (HV) distribution networks.

The term "high voltage" is related to voltages higher than 35 kV, reaching also one or more hundreds of kilovolts.

The distribution networks make use of cables that may, for example, be aerial (overhead) or underground, for example positioned in tunnels.

In addition to cables, distribution networks can comprise a number of different ancillary elements that, strictly speaking, do not play a direct role in the electric power distribution, being instead used to guarantee proper conditions of usage and security of the distribution line.

Examples of ancillary elements are surge voltage limiters (SVLs), also known as surge arresters (SAs) or surge suppressors, oil pressure monitoring systems for oil-filled cables, thermometers to check the pumps for circulating cooling water and the cooling water temperature itself.

The monitoring and the maintenance of the ancillary elements of a cable, in view of the environment where the cables are located, which can be either critical, because recessed, and/or dangerous, like in the case of HV networks, may be cumbersome, and cannot be effected on a frequent time basis. Even when the ancillary elements are not enclosed in protective boxes, the monitoring of their operating conditions can imply long inspections and/or the interruption of the distribution of the electric power.

This is indeed strongly undesired, because an electric power distribution line normally supplies a very large area and a substantial number of users, which are never ready to accept a service interruption.

There is therefore the need of devising a solution to the problem of monitoring the proper operation of ancillary elements like SVLs, oil pressure monitoring systems, thermometers with the aim of being able to replace them as readily as possible when they break.

In the published Japanese patent application JP 04-092523, a detecting sensor for contact information is described, to detect the contact information with no mechanical force applied. Light shading mechanisms are provided and operate by the contact information between optical branches devices and mirrors provided at plural areas of an optical fibers.

The Applicant observed that said shading mechanisms are of the active type, i.e. require an outer energy source to operate, particularly, in the examples provided, an electric power supply. No application to power cables is envisaged In the published Japanese patent application JP 2004309219, a sensor measuring system is disclosed, comprising a plurality of fiber measuring sensors for measuring a number of physical quantities.

The Applicant observes that the sensors are positioned in series on a main optical fiber, not on the branching thereof, therefore intensity reduction in one of them lessens the amount of light available in the following sensors, thereby reducing the measurement dynamics.

In the published Japanese patent application JP 03-231116, an optical fiber sensor is disclosed wherein fiber end faces of multiple branched optical fibers are inserted into oil, and pulse light is inputted from a reflection measuring device like an optical time domain reflectometer (OTDR); Fresnel reflection at the fiber end is therefore attenuated and so the event detected.

The published U.S. patent application 2004/0240769 describes an alarm condition distributed fiber optic sensor with storage transmission-reflection analyzer. The Applicant observed that both transmission and reflection detectors are electrically connected to the storage transmission-reflection analyzer.

The U.S. Pat. No. 5,035,511 describes a distributed fiber optic temperature sensor based on time domain transmission. Light is transmitted through the sensor only one time, and not reflected back.

SUMMARY OF THE INVENTION

The Applicant faced the problem of monitoring the change of a physical quantity (e.g. temperature, magnetic effect), in a set of ancillary elements (e.g., surge arresters) distributed in different positions of an electric power distribution network. Critical environments (e.g. high voltage and/or recessed power cables) would imply the fulfillment of a number of requirements:

the monitoring system should be passive;
the position (and, possibly, the moment) of the occurrence of change of physical quantity should be remotely identified, with no need of direct inspections, which are often difficult or even impossible to carry out;
the monitoring system should be able to recognize and identify multiple changes of physical quantity occurring substantially at the same time in different positions.
preferably, the monitoring system should be able to recognize and identify changes of physical quantity irrespective from the duration thereof (the system reaction should be faster than the monitored event duration, however the detection time can be longer than the event duration).

In the present description and claims, the term "passive" is intended for a device or component not requiring a dedicated energy source for performing the intended function. Such a device or component can be activated by a physical phenomenon generated by, e.g., a surge (transient sudden rise of current or voltage in an electrical circuit) or fault or disturbance, with no need of other power feeding devices, e.g. battery. In particular, no electrical energy nor mechanical energy are needed. Indeed, the presence of local feeding devices for the monitoring device or component could give rise to the same problems and troubles set for the above in connection to the ancillary elements.

According to an aspect, the present invention relates to a monitoring system for monitoring ancillary elements of an electric power distribution network, comprising:

at least one optical fiber path;

at least one optical branch branching from the optical fiber path and operatively associated with a respective ancillary element, each optical branch comprising and at least one passive optical attenuator operatively coupled to the respective ancillary element and having an attenuation adapted to change in response to a change in operating conditions of the respective ancillary element, and an optical reflector;

an optical radiation source adapted to inject an optical radiation into the optical fiber path; and an optical receiver adapted to detect back-reflected optical radiation reflected by said optical reflector;

said monitoring system being adapted to recognize a position of the at least one of the ancillary elements based on a characteristic of the back-reflected optical radiation.

Preferably said monitoring system recognizes the position of the at least one of the ancillary elements by the optical receiver.

For the purpose of the present description and claims:

by "optical source" it is intended a source of optical radiation adapted to propagate through an optical fiber; examples of optical sources are lasers and OTDR apparatus;

by "optical receiver" it is meant a device detecting an optical signal, converting it into an electrical signal, and processing the electrical signal as required for further use; examples of optical receiver are photodetectors, particularly photodiodes, OTDR apparatuses, and optical spectrum analyzers (OSAs);

by "optical attenuator" there is intended a device altering the intensity of an optical radiation transmitted through an optical fiber following; a special case of optical attenuator is an optical shutter, which is a device adapted to either substantially stop or let pass the optical radiation; for the purposes of the present invention, such a device is activated by an external physical phenomenon related to the physical quantity the change of which is monitored;

by "splitter" or "directional coupler" an optical coupling device is meant for separately coupling or splitting optical signals (in a known coupling loss) in a transmission line;

by "coupling" there is meant the transfer of energy from one optical fiber to another or a branch thereof in a splitter;

by "Fresnel reflection" it is intended the reflection of optical radiation predicted by the Fresnel equations describing the behavior of light when moving through media of differing refractive indices; for common glass, the reflection coefficient is about 4%;

by "reflector", a device is meant sending a portion of optical radiation back to where it came from (mirror); an example of reflector is a surface resulting from a cut substantially perpendicular) (80-90° to the longitudinal axis of an optical fiber, said surface being optionally covered by a reflecting material, e.g. gold; typically the reflector is part of a reflective pigtail (a pigtail is a terminal segment of an optical fiber having a free, unconnected end); another example of reflector is a fiber grating;

by "back-reflected optical radiation" it is intended the portion of optical radiation that, after having been reflected by the reflector, propagates back towards the optical receiver; the back-reflected optical radiation has characteristics that are typical of an optical radiation, and characteristics that may be imparted to the optical radiation by the optical attenuator and/or the reflector; examples of characteristics of the back-reflected optical radiation are: the intensity (as a function of time), the polarization state, the wavelength, the radiation spectrum, the frequency of switching between two discrete values of intensity; the propagation delay from where the back-reflected optical radiation is reflected back to the optical receiver.

Ancillary elements to be monitored may include at least one element selected from the group consisting of surge voltage limiters, thermometers, pressure monitors. Preferably the ancillary elements are surge voltage limiters.

The passive optical attenuator may be responsive to a current flowing through the ancillary element operatively coupled thereto.

The passive optical attenuator may be thermally coupled to the respective ancillary component.

The passive optical attenuator may have an attenuation varying with temperature, in such a way that a temperature increase caused by current flowing through the ancillary element operatively associated therewith causes a change in the attenuation value. Alternatively, the passive optical attenuator may include a latching-type optical switch, and the attenuation value is adapted to switch between said first and second attenuation values each time the ancillary element operatively associated therewith is involved in a discharge.

The attenuation of the passive optical attenuator may be adapted to repeatedly switch between said first and second attenuation values when the ancillary element associated thereto conducts a current for a prolonged time.

Preferably, a fraction of the optical radiation that is spilled by each optical branch varies monotonically, particularly decreases along the optical fiber path.

According to another aspect, the present invention relates to a method for monitoring ancillary elements of an electric power distribution network, comprising:

associating the electric power distribution network to at least one optical fiber path;

associating an ancillary elements to be monitored to a respective optical branch branching from the optical fiber path;

operatively coupling at least one passive optical attenuator to each of the ancillary elements, the passive optical attenuator being part of the optical branch associated with the respective ancillary element;

propagating an optical radiation into the optical fiber path;

responsive to a change in operating condition of at least one of the ancillary elements, causing a spilled optical radiation propagating through at least one of the optical branches to be back-reflected;

detecting the back-reflected optical radiation; and recognizing a position, along the electric power distribution network, of said at least one of the ancillary elements based on a characteristic of the detected back-reflected optical radiation.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

The features and advantages of the present invention will be made apparent by reading the following description of some embodiments thereof, provided by way of exemplary and non-limitative examples, description that will be conducted making reference to the annexed drawings, wherein.

DETAILED DESCRIPTION OF THE PREFERRED EMBODIMENTS

Figure 1:
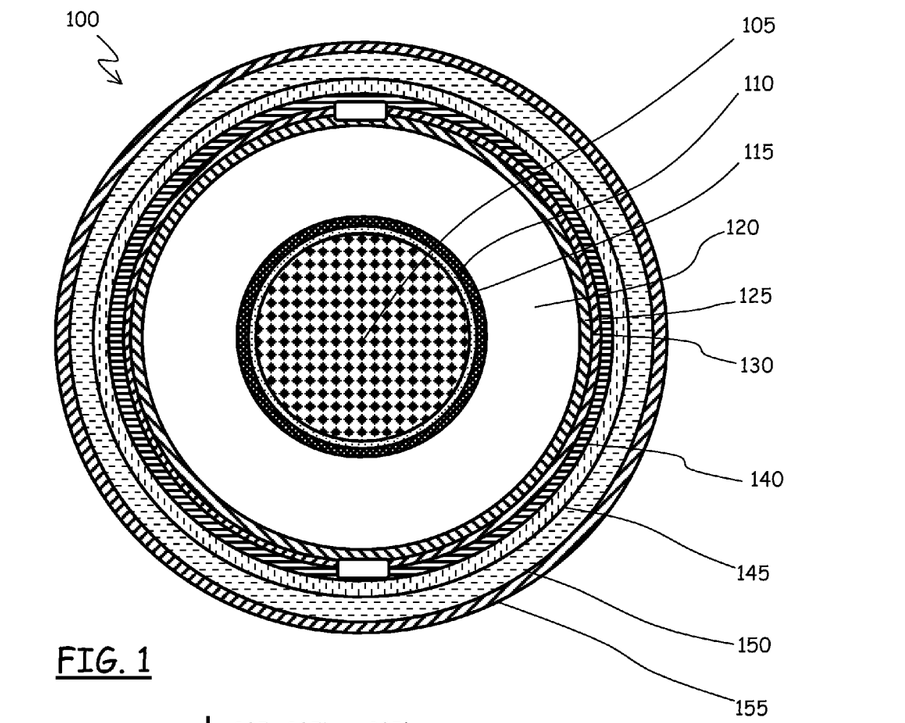
FIG. 1 shows, in cross section, a cable used in HV electric power distribution systems, where the present invention can be applied.

FIG. 1 shows, in cross section, a cable 100 for HV electric power distribution networks; particularly a single-core cable. The cable 100 comprises, starting from the center thereof and moving radially outwards, a central conductor 105, a binder 110, made of a semi-conductive tape, a conductor screen 115, made of a semi-conductive polymer, an insulation layer 120 made, for example, of cross-linked polyethylene (XLPE), an insulation screen 125, also made of a semi-conductive polymer, a semi-conductive water barrier 130, made for example of a semi-conductive hygroscopic tape, a metallic sheath 140, made of a metal sheet, a jacket 145 of high-density polyethylene (HDPE), and finally a protective coating 150, typically semi-conductive. The cable 100 can be used both in aerial applications or underground.

The metallic sheath 140 has primarily the function of making the electromagnetic field uniform around the conductor 105.

Phenomena like lightning, switch-on maneuvers of the electric power distribution network, line-to-line ground faults, load rejection, ferroresonance, just to cite a few, can cause a voltage rise in the metallic sheath to unacceptably high values, e.g. higher than 1 KV. In order to protect the cable 100 from detrimental over-voltages (surges), ancillary elements, particularly SVLs are used.

Figure 2:
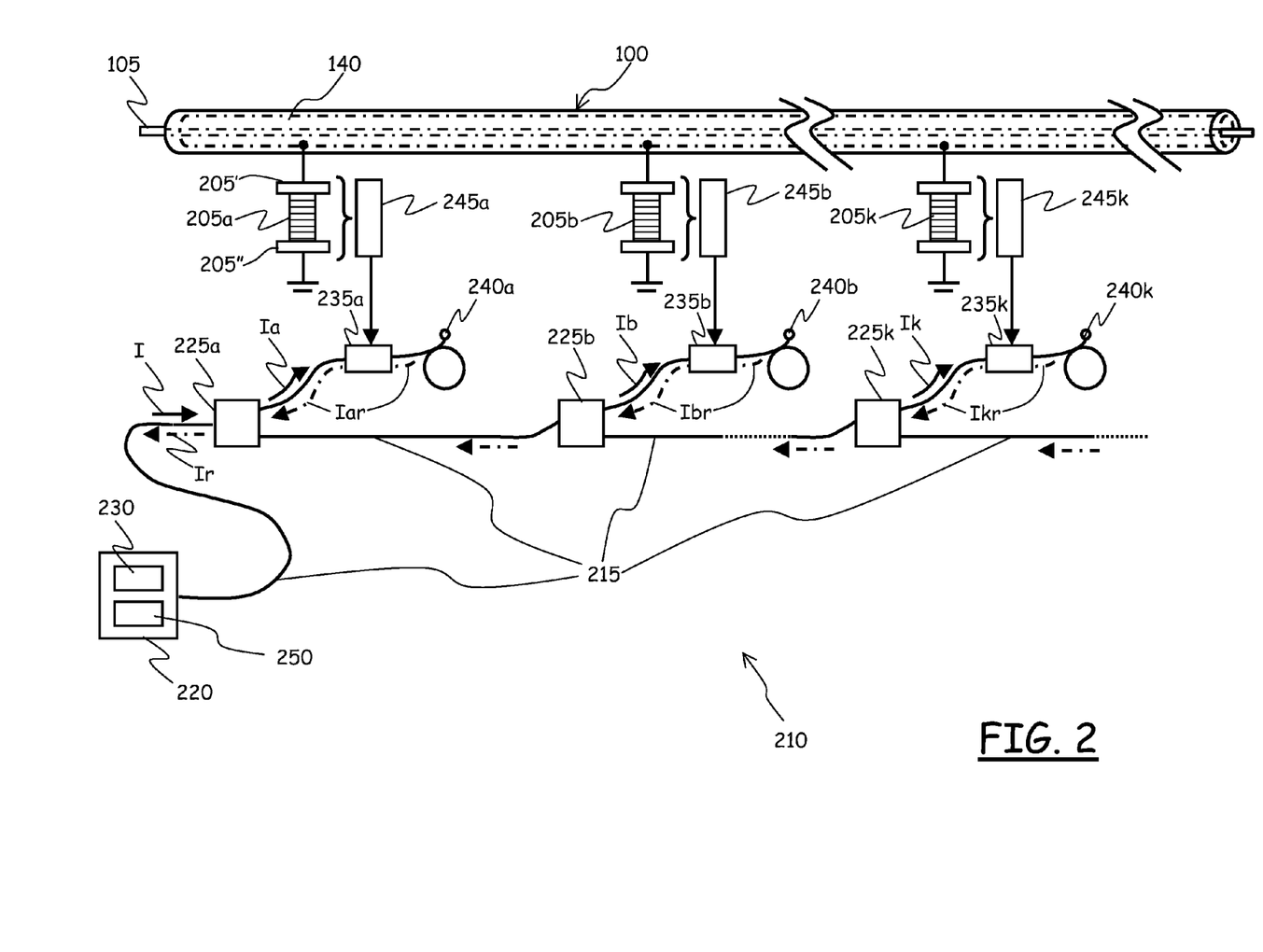
FIG. 2 schematically shows a monitoring system according to an embodiment of the present invention, applied to an electric power distribution system for monitoring the SVLs protecting it.

Advantageously, a plurality of SVLs are coupled to an electric power distribution cable like cable 100, being distributed approximately every 500 m along the cable. Each SVL has a first end 205' electrically connected to the cable metallic sheath 140, and a second end 205" electrically connected to earth. FIG. 2 schematically shows a segment of the cable 100, intended to distribute one of the three phases of a triphase HV electric power distribution line, with associated a plurality of SVLs 205a, 205b, . . . , 205k, positioned at a distance from each other along the cable 100, for example at intervals of approximately 500 m.

The SVL is an ancillary element implementing a highly non-linear resistor, and, for applications requiring high power dissipation, like in HV electric power distribution systems, it comprises a plurality of metal-oxide discs in columns between said first and second end, inside a non-metallic housing. An example of SVL suitable for the present invention is MW08 marketed by ABB.

In case the voltage of the metallic sheath 140 raises over the intervention threshold of the SVL (designed to keep the metallic sheath voltage below a few kilovolts), the SVL becomes conductive, and thus, for a brief transient (of the order of few microseconds), it shorts the cable sheath to the earth, limiting the sheath voltage to acceptable values. In normal conditions (i.e., when an SVL operates properly), no current flows therethrough, apart during discharges, when the cable experience overvoltages; thus, normally there is no current circulating along the metallic sheath 140.

SVLs are reliable components. However, a discharge running across the metal-oxide discs causes a partial sinterization of the discs material, said sinterization being directly related to the discharged energy. The sinterized material looses part of its electrical characteristics.

Each SVL can thus withstand a limited number of discharges (nominally and on average, each SVL can survive without damages about eight-ten typical switching surge discharges). In normal conditions (i.e., when an SVL operates properly), no current flows therethrough, apart during discharges, when the cable sheath experiences over-voltages. However, when the discharged accumulated energy is sufficiently high, a conductive path is formed across the metal-oxide discs, and the SVL breaks, becoming conductive and thus loosing its protection capabilities.

An out of order SVL causes the establishment of a conductive current path to earth, and thus enables the circulation of currents that unacceptably increase the overall circuit losses. In certain cases, the broken SVL could also blow up, possibly causing damages to the cable and to the surroundings.

For this reason, damaged or out of order SVLs should be replaced as soon as possible, and for this purpose a regular inspection of the SVLs installed on an electric power distribution line should be carried out to ensure that these elements operate properly, and, when a damaged or out of order SVL is detected, to immediately replace it.

Unfortunately, SVLs are often not easily accessible, or even totally inaccessible to men, because they are normally installed in protective link boxes, being connected to the (metallic sheath of the) cables by means of dedicated sub-lines; these boxes are usually sealed and bolted, and the cables themselves are not easily accessible. This is rather common in recessed distribution networks.

Referring to FIG. 2, a system according to an embodiment of the present invention allows to monitor the operation of the SVLs used to protect the cable 100. The monitoring system, denoted globally as 210, is a passive, optical-based system, comprising an optical fiber 215 that, starting from a central monitoring unit 220, runs along the cable 100. In correspondence of the SVLs 205a, 205b, . . . , 205k, optical splitters 225a, 225b, . . . , 225k are provided along the optical fiber 215; the optical splitters 225a, 225b, . . . , 225k are designed to spill a selected fraction Ia, Ib, . . . , Ik of the optical power I of an optical radiation injected into the optical fiber 215 by an optical source 230 of the central monitoring unit 220 and propagating along the fiber 215.

Each spilled fraction Ia, Ib, ..., Ik of optical radiation is fed to a respective optical branch, comprising an optical attenuator 235a, 235b, ..., 235k and, downstream it, a reflector 240a, 240b, ..., 240k. In the present embodiment, when the optical attenuator 235a, 235b, ..., 235k are closed, they block the optical radiation spilled by the associated optical splitter 225a, 225b, ..., 225k, impeding the reflection of said radiation. Advantageously, said optical attenuators may be low back-reflection optical shutters. An example of optical attenuator suitable for the present invention is the In-Line Optical Fiber Shutter marketed by Phoenix Photonics.

Each optical attenuator 235a, 235b, ..., 235k is operatively coupled to the respective SVL 205a, 205b, ..., 205k, by means of a suitable coupling device 245a, 245b, ..., 245k.

The coupling device 245a, 245b, ..., 245k can be thermal, electrical, magnetic or mechanical, or a combination thereof.

The coupling device 245a, 245b, ..., 245k is designed such that an operating condition of the SVLs 205a, 205b, ..., 205k to be monitored, for example the passage of a current therethrough, induces a change in the state of the optical attenuator 235a, 235b, ..., 235k, e.g., it causes the optical attenuator 235a, 235b, ..., 235k to open, so that the fraction of optical radiation Ia, Ib, ..., Ik spilled by the respective optical splitter 225a, 225b, ..., 225k passes through the optical attenuator and reaches the reflector 240a, 240b, ..., 240k. An example of coupling device suitable for the present invention is the Fiber Optic Coupler, 1×2 port configuration, marketed by FiberLogix.

The reflector 240a, 240b, ..., 240k is designed to reflect, e.g. by Fresnel reflection, the incident fraction of optical radiation Ia, Ib, ..., Ik. In particular, the reflector 240a, 240b, ..., 240k may be a mirror surface, obtained by cutting an optical fiber substantially orthogonally (at an angle of 90°±3°) to its longitudinal axis, and optionally, but advantageously coating the surface thus obtained with a reflecting material, such as dielectric layers or gold. In the case of the presence of a reflecting material that cut can have a more oblique angle as known to the skilled in the art, for example of 90°±10°.

In a preferred embodiment, the reflector 240a, 240b, ..., 240k may be part of a reflective pigtail.

The central monitoring unit 220 also includes an optical receiver 250, optically coupled to the optical fiber 215 so as to receive and be able to detect back-reflected optical radiation Ir that propagates along the optical fiber 215 in the direction opposite to the injected optical radiation I. In particular, the optical receiver 250 can comprise an opto-electrical conversion part, that is adapted to convert the detected optical radiation Ir into electrical signals, and a signal processing part, adapted to process the electrical signals resulting from the conversion of the detected back-reflected optical radiation Ir.

The monitoring system 210 of this embodiment of the present invention operates in the following way.

The optical source 230 of the central monitoring unit 220 injects into the fiber 215 an optical radiation I, at a selected wavelength; the injected optical radiation I propagates through the fiber 215, and when it reaches the optical splitter 225a, in correspondence to the SVL 205a, a selected fraction Ia of the optical radiation is spilled and fed to the optical branch, while the remaining part of the optical radiation continues to propagate along the fiber 215. The same occurs at each subsequent optical splitter 225b, ..., 225k.

As long as an SVL 205a, 205b, ..., 205k does not conduct current, the optical attenuator 235a, 235b, ..., 235k operatively associated therewith does not change state, corresponding to the low back-reflection condition of the incident optical radiation (closed state, for an optical shutter); thus, the spilled fraction of optical radiation Ia, Ib, ..., Ik, when reaching the optical attenuator 235a, 235b, ..., 235k, is blocked, and no significant back-reflection takes place at the optical attenuator 235a, 235b, ..., 235k. The opposite occurs if the optical attenuator is in the low attenuation (open, for an optical shutter) state.

When instead one of the SVLs 205a, 205b, ..., 205k conducts a current, for example because the SVL is discharging an over-voltage of the metallic sheath 140 of the cable 100 (in this case the SVL becomes conductive for a short transient, and then returns to its non-conductive state), or because the SVL has broken and there is a continuous current flow, the coupling device 245a, 245b, ..., 245k causes a change in the state of the optical attenuator 235a, 235b, ..., 235k operatively associated with that SVL, and the spilled fraction of optical radiation Ia, Ib, ..., Ik can thus propagate through the optical attenuator 235a, 235b, ..., 235k and reach the reflector 240a, 240b, ..., 240k, where a non-negligible part Iar, Ibr, ..., Ikr of the spilled fraction of optical radiation is reflected back towards the splitter 225a, 225b, ..., 225k, which injects the back-reflected optical radiation into the optical fiber 215; the back-reflected optical radiation Iar, Ibr, ..., Ikr propagates to the central monitoring unit 220, where it is received and detected by the optical receiver 250.

The optical receiver 250 thus detects a change in the reflection pattern of the optical radiation, and the detected change indicates a change in the state of at least one SVLs.

The optical source 230 may be a laser.

The optical splitter 225a, 225b, ..., 225k may be an all-fiber device made by coupling two optical fibers, one being the optical fiber 215 that continues along the cable 205, the other the optical fiber of the local optical branch, joined together for a certain length; this kind of optical splitter, which has the advantage of being an all fiber device (all made of optical fibers), works also as an optical coupler, re-injecting the back-reflected optical radiation Ir into the optical fiber 215. As an alternative, micro-optics splitters can be used, with lenses that spill optical radiation from the fiber 215, and partially-reflecting mirrors for re-injecting the back-reflected optical radiation into the fiber.

The optical receiver 250 may be a photodetector, like a photodiode, an OTDR apparatus, an OSA.

In general, a change in the state of the optical attenuator 235a, 235b, ..., 235k, for example, for an optical shutter, a change from a closed state to the open state, allows the optical receiver determining that one of the SVLs 205a, 205b, ..., 205k carries a current, based on the back-reflected optical radiation.

Depending on the optical receiver, different characteristics of the back-reflected optical radiation can be detected, particularly, either intrinsic characteristics of the optical radiation or a characteristics imparted to the back-reflected optical radiation by the optical attenuator and/or the reflector.

For example, using an OTDR apparatus the characteristic that allows determining the position of the SVL is the change in time of the intensity of back-reflected optical radiation. In particular, as described in greater detail in the following, with an OTDR apparatus the position of the SVL where current has flown in results from the position of a reflection peak in the reflection pattern.

Using a photodiode, the position of the SVL may be determined exploiting a characteristic imparted to the back-reflected optical radiation by the optical attenuator, for example a frequency of a periodical switching of the intensity of the back-reflected optical radiation between two (or more) values. Using an OSA, the position of the SVL may be determined exploiting a characteristic that is imparted to the back-reflected optical radiation by the reflector, using a wavelength-selective reflector, like a fiber grating.

Figures 3, 4, 5A, 5B:
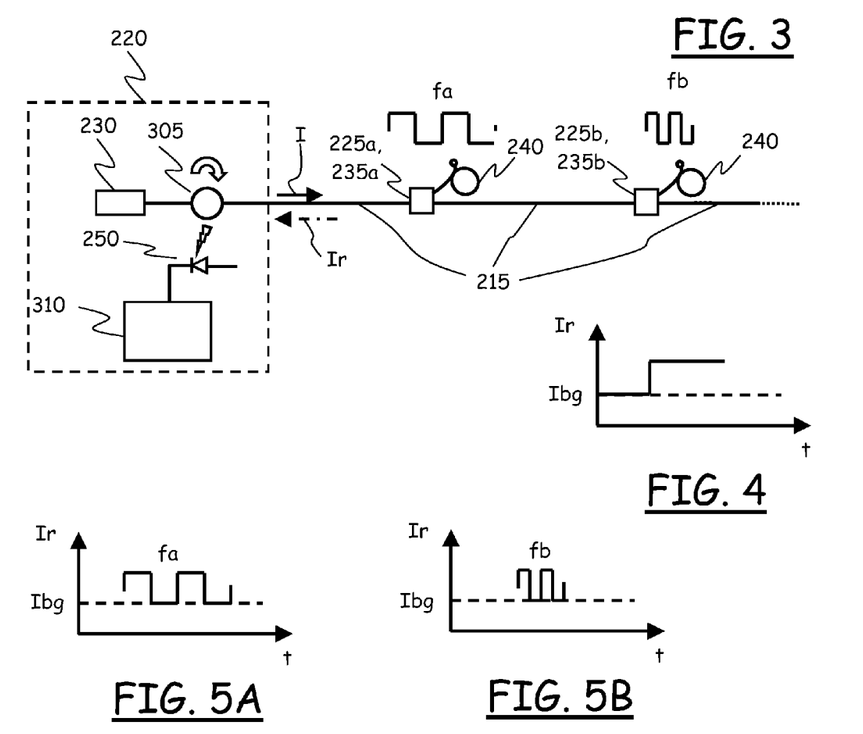
FIG. 3 schematically shows the monitoring system of FIG. 2 with a first embodiment of optical receiver.
FIG. 4 is a simplified diagram showing a back-reflected optical radiation pattern that can be detected by the optical receiver.
FIGS. 5A and 5B are simplified diagrams of two different patterns of back-reflected optical radiations that can be detected by an optical receiver, adapted to identify which of the connected ancillary element detects a change of physical quantity.

In an embodiment schematically depicted in FIG. 3, the optical receiver 250 includes a photodetector, like a photodiode optically coupled to the optical fiber 215 through an optical circulator 305 or other suitable component, like a coupler; the photodiode 250 generates, by opto-electrical conversion, electrical signals that are processed by an electronic signal processing unit 310. In an optical fiber glass dishomogeneity causes a certain amount of back-reflection when the injected optical radiation I propagates; the photodiode 250 detects the whole optical radiation Ir generated by back-reflection of the injected optical radiation I while the latter propagates along the fiber 215, and this back-reflected optical radiation, not deriving from the reflection by the reflectors 240a, 240b, . . . , 240k, forms a substantially stationary background. When one of the optical attenuators 235a, 235b, . . . , 235k changes state, passing to a low attenuation state, an increase over the stationary background of back-reflected optical radiation intensity is detected by the photodiode, due to the back-reflection of the optical radiation Iar, Ibr, . . . , Ikr by one of the reflectors 240a, 240b, . . . , 240k (FIG. 4).

In an embodiment of the present invention, the coupling circuits 245a, 245b, . . . , 245k and the optical attenuators 235a, 235b, . . . , 235k are such that, as a consequence of the detected conduction of current by the respective SVL, the optical attenuator 235a, 235b, . . . , 235k repeatedly switches between a state of low and a state of high attenuation (in the exemplary case of an optical shutter, it repeatedly switches between the open and closed states); provided that such repeated switching occurs with a time pattern, e.g. a peculiar time period, different for each of the optical attenuators 235a, 235b, . . . , 235k, then a photodetector in the central monitoring unit 220 is able, in addition to detect the peak in the back-reflected optical radiation above the constant background, to determine which of the SVLs is conducting current, based on the switching frequency of the peaks in the back-reflected optical radiation.

This situation is schematically depicted in FIG. 3 in connection with FIGS. 5A and 5B. The optical attenuator 235a, associated with the SVL 205a, is designed in such a way that, when the SVL 205a conducts current, the shutter 235a repeatedly switches between a low attenuation and a high attenuation state, e.g. open and closed in case of an optical shutter, with a peculiar frequency fa, while the optical attenuator 235b associated with the SVL 205b, is designed in such a way that, when the SVL 205b conducts current, the optical attenuator 235b repeatedly switches open and closed with a peculiar frequency fb; thus, the signals detected by the photodiode 250 is a waveform that has either frequency fa, like in FIG. 5A, or frequency fb, like in FIG. 5B. The signal processing unit 310 may thus identify which SVL is involved, because there is a correlation between the SVLs and the frequency of the detected signal. In case of simultaneous current flow through two or more SVLs, the SVLs can be identified by means of Fourier analysis, revealing the frequency content of the global signal.

One way to achieve the above result is that, after suitable voltage and current reduction, the current that flows through the SVL drives a time delay relay, in which the pulse repetition rate can be set individually for each element to be monitored; the pulse train is then used to switch on and off the optical attenuator.

Figure 6:
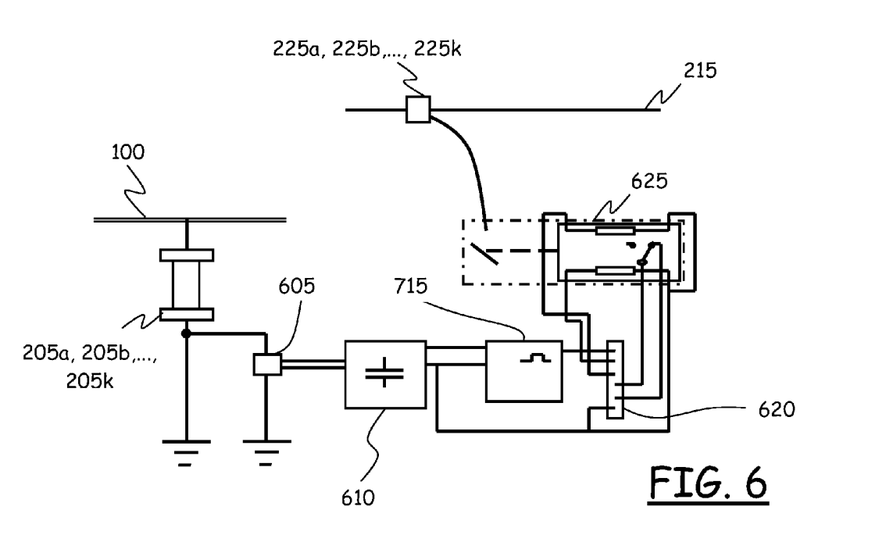
FIG. 6 schematically shows an optical attenuator according to another embodiment of the present invention, together with a circuit arrangement for the optical attenuator.

In FIG. 6 there is schematically shown an arrangement adapted to produce the alternation of open-closed states. An amperometric transformer 605 is connected in shunt to the discharge path that discharges the over-voltages experienced by the metallic sheath 140 of the cable 100. The amperometric transformer 605 is coupled to an electric charge storage block 610 comprising one or more capacitors and a voltage stabilizer. The block 610 produces a drive voltage for a timer circuit 615, particularly a long-time oscillator which drives a stepper relay 620; the relay 620 commands the change of state of a latching-type electro-mechanical optical switch 625.

When the SVL is broken (or when the metallic sheath 140 of the cable 100 experiences an over-voltage for a long time), a current flows therethrough; the amperometric transformer 605 generates a voltage that charges the capacitor (and is stabilized) in the block 610. The voltage feeds the long-time timer 615, which generates a switching voltage signal (the voltage switches repeatedly high and low), with a pre-set time period, that the stepper relay 620 is able to discriminate, feeding the coils of the electro-mechanical optical switch 625 with voltages in alternated way, thereby producing a switching open and closed of the optical attenuator.

The arrangement of FIG. 6 can also be used for detecting fast discharges. In this case, the current flows through the SVL for only a short transient; the amperometric transformer 605 generates a voltage that charges the capacitor (and is stabilized) in the block 610; the voltage thus generated, fed to the timer 615, causes the latter to generate a one-shot voltage pulse, which is fed to the stepper relay 620; the latter causes the optical switch 625 to change its state (thereby the optical attenuator switches, for example, from closed to open). Being the optical switch of the latching type, it remains in the attained state even after the discharge is terminated and the voltage generated by the amperometric transformer 605 disappears. In this case, each time one of the SVLs becomes conductive for discharging an over-voltage of the metallic sheath 140 (e.g. due to a lightning), the associated optical attenuator changes state, from closed to open, or from open to close, accordingly the spilled fraction of light keeps on being back-reflected or stopped until the next discharge.

Figure 7:
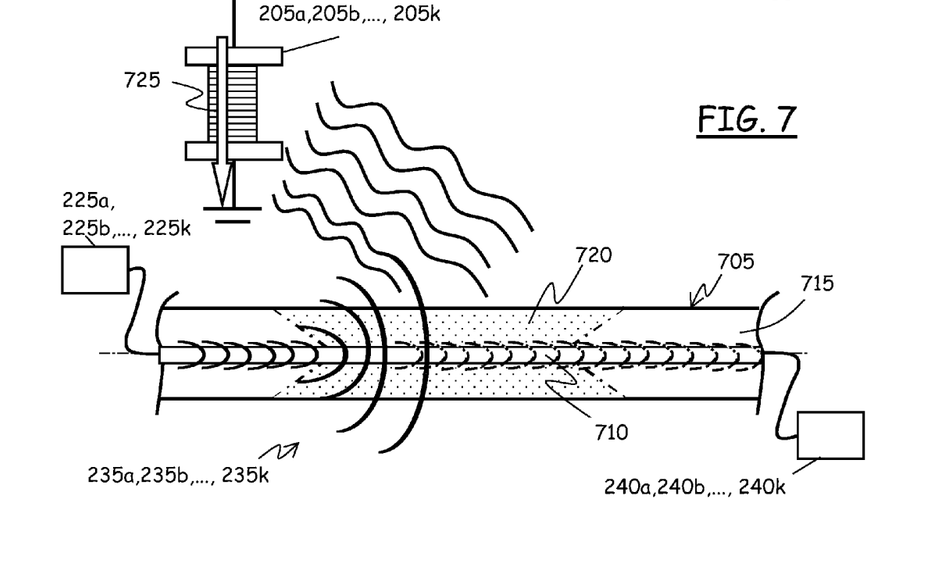
FIG. 7 schematically shows an embodiment of optical attenuator than can be used in the monitoring system.

In FIG. 7 a possible embodiment of passive thermal optical attenuator is schematically depicted, being an all-fiber, "evanescent field" device. The device comprises an optical fiber 705, with a fiber core 710 surrounded by a cladding 715 having refraction index lower than that of the core 710 exception made for a portion 720, made of a suitable polymer, for example a photopolymer marketed by DuPont de Nemours, providing the cladding with a refraction index variable with the temperature, and particularly in such a way that, at room temperature (e.g., 25° C.) the refraction index is higher than that of the core 710, while for higher temperatures the refraction index decreases. The fiber 705, particularly the portion 720 thereof, is in thermal coupling with the respective SVL 205a, 205b, . . . , 205k, for example by physical direct contact. When the SVL does not conduct current, its temperature is relatively low (it is substantially at the room temperature), so the cladding portion 720 has a refraction index higher than that of the core 710 and the optical fiber 705 does not guide any longer the optical radiation coming from the optical splitter 225a, 225b, . . . , 225k, which is thus dispersed and does not reach the reflector 240a, 240b, . . . , 240k. When on the contrary the SVL conducts a current 725, the heat generated by Joule effect causes the temperature of the optical fiber 705 to increase, so that the refraction index of the polymeric cladding portion 720 lowers below that of the core 710; the optical radiation coming from the optical splitter 225a,

225b, ..., 225k can thus pass through the optical attenuator and reach the reflector 240a, 240b, ..., 240k, where it is reflected back.

The thermal optical attenuator of FIG. 7 can be used in combination with an OTDR apparatus, which is used as both optical source 230 and optical receiver 250. As known in the art, an OTDR apparatus is an optoelectronic instrument that is often used to characterize optical fibers. The OTDR apparatus is configured to inject a series of optical radiation pulses into the optical fiber 215. The optical radiation pulses propagate along the optical fiber 215; the optical radiation I is reflected back from points in the fiber where, due for example to fiber dishomogeneity, the index of refraction changes. The intensity of the return pulses is measured and integrated as a function of time, and is plotted, e.g. on a display device, as a function of fiber length. The diagram in FIG. 8A shows an exemplary curve 805 of the intensity of the back-reflected optical radiation Ir (in ordinate, units [dB]) as a function of the distance along the optical fiber 215 (in abscissa, units [Km]); the intensity decreases substantially smoothly, apart from the locations where there are the optical splitters 225a, 225b, ..., 225k: step-wise intensity decreases 810a, 810b, 810c, 810d, 810e are visible in positions corresponding to where the optical splitters are placed along the cable.

Figure 8A:
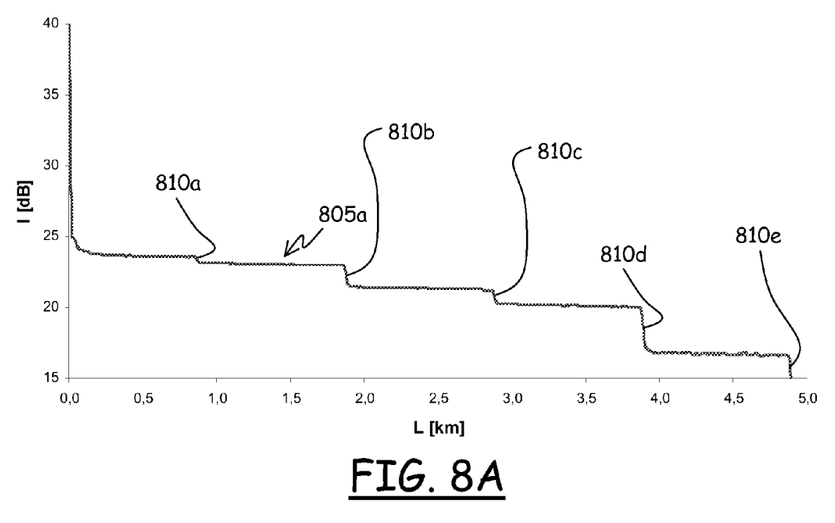
FIGS. 8A to 8C are diagrams showing different patterns of back-reflected optical radiation that can be detected by an Optical Time Domain Reflectometer (OTDR) used as the optical receiver of the monitoring system.
Figure 8B:
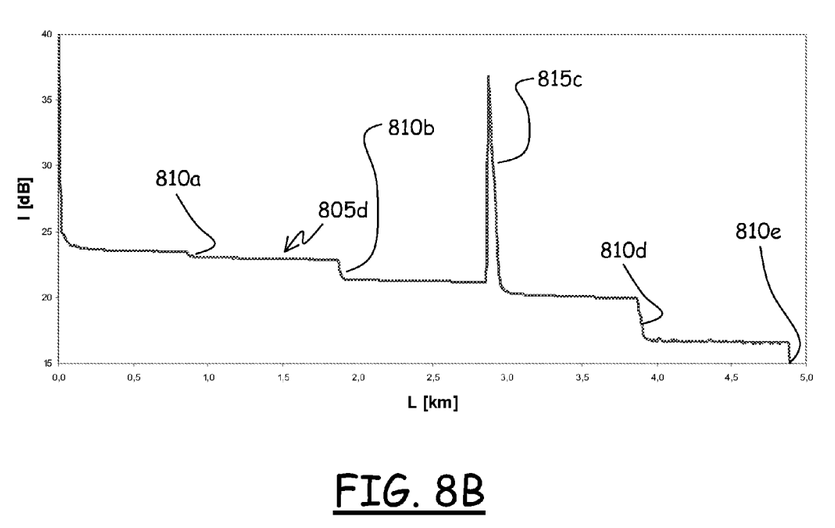
Figure 8C:
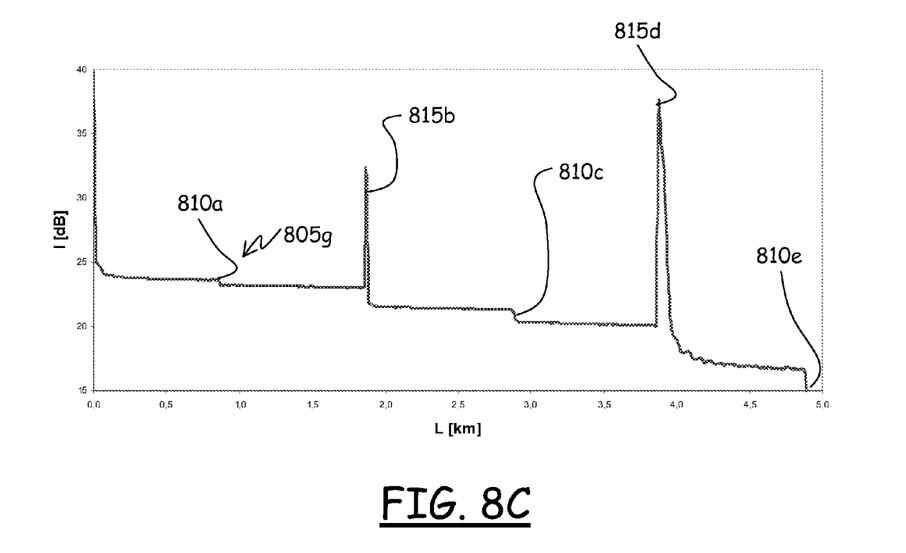

While the example of FIG. 8A refers to a case in which all the optical attenuators are in the high attenuation state (closed, in case of optical shutters), so there is no back reflection of the spilled optical radiation (the only back-reflected optical radiation is due to the intrinsic dishomogeneity of the optical fiber 215), in FIGS. 8B and 8C there are shown different cases in which one or more of the optical attenuators are in the low attenuation state (open, in case of optical shutters), and the optical radiation is back-reflected by the reflectors 240a, 240b, ..., 240k. In particular, in the curve 805b of FIG. 8B a peak 815c in the intensity of the back-reflected optical radiation Ir is visible in the position corresponding to the third optical splitter. In the curve 805c of FIG. 8C two peaks 815b and 815d in the intensity of the back-reflected optical radiation Ir are visible in the positions corresponding to the second and fourth optical splitters. Based on the positions of the detected peak or peaks in the intensity of the back-reflected optical radiation, it is thus possible to determine which SVL is involved.

As an alternative to the OTDR apparatus, that generates optical radiation pulses, a Correlation OTDR apparatus (COTDR) can be used. As known to those skilled in the art, a COTDR apparatus generates a series of optical radiation pulses and correlates them with the back-reflected optical radiation.

The OTDR or COTDR apparatuses can be used in combination with any of the optical attenuator types described in the foregoing.

Using the thermal optical attenuator, the OTDR or COTDR apparatus is capable of identifying which of the SVLs conducts current, based on the determination of the location of the peak in the intensity of the back-reflected optical radiation. Using an OTDR or COTDR apparatus and the arrangement of FIG. 5 it is also possible to "count" the number of discharge events individually sustained by each of the SVLs, by counting the number of times the associated optical shutter changes state (from closed to open, or vice versa).

In this way it is possible to perform a preventive maintenance of the SVLs: when a generic SVL approaches the maximum number (typically, eight-ten) of discharges that it can sustain without breaking, it is replaced.

The splitting ratio of the different optical splitters 225a, 225b, ..., 225k may coincide, or alternatively, each optical splitter may have a peculiar splitting ratio. For example, the splitting ratio of the optical splitters close to the central monitoring unit 220 may be lower than that of the optical splitters far away from it, so that the peaks in the back-reflected optical radiation intensity corresponding to the SVLs closer to the central monitoring unit 220 are lowered. For example, the optical splitter farthest from the central monitoring unit 220 can have a 50/50 split ratio, whereas the other splitters can have a 20/80 split ratio. In particular, the split ratio may depend on the reflectivity of the reflector 240a, 240b, ..., 240k: for example, in case of simple Fresnel reflection at a cut optical fiber edge, the split ratio (i.e., the amount of spilled optical radiation) should be increased, whereas the use of a high-reflectivity pigtail allows reducing the split ratio. The fraction of optical radiation that is spilled at each optical splitter may decrease monotonically as one moves away from the optical source. Also, in order to adjust (reduce) the intensity of the optical radiation that is back-reflected by each reflector 240a, 240b, ..., 240k, an optical fiber loop, schematically depicted in FIG. 2 and denoted 255 therein, may be provided between the optical shutter 235a, 235b, ..., 235k and the reflector 240a, 240b, ..., 240k: by changing the bending radius of the fiber loop 255, the optical losses are increased/decreased.

As an alternative to the use of a high-reflectivity pigtail, the reflector 240a, 240b, ..., 240k may be made by optical fiber gratings, designed to selectively reflect optical radiation at different wavelengths depending on the SVL, and, at the central monitoring unit 220, an OSA may be employed to discriminate the back-reflected optical radiation wavelength, and thus to localize the SVL.

Other types of optical attenuators can also be used, for example optical attenuators based on the electro-optic or magneto-optic effect, or mechanical shutters. Also, two or more different types of optical attenuators may be combined: for example, a thermal optical attenuator may be used in conjunction with an electro-mechanical optical attenuator. More generally, any component adapted to either attenuate and/or block an incident optical radiation, or to let it pass through can be used.

Figure 9:
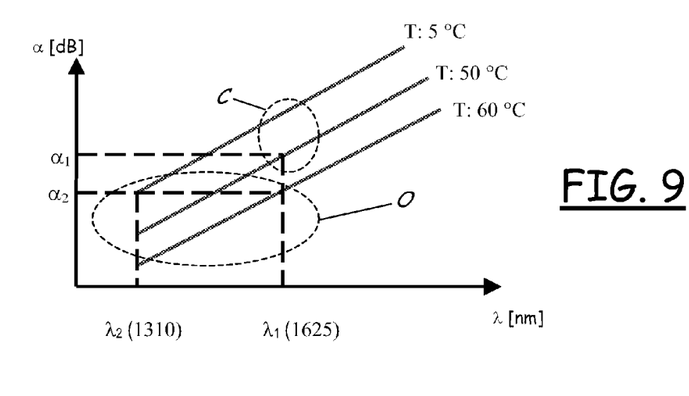
FIG. 9 is a schematic diagram showing the variation of the attenuation of an exemplary Variable Optical Attenuator (VOA) that can be used as an optical shutter of the monitoring system.

The present invention also relates to remotely assess the integrity of the monitoring system. Indeed, should the optical fiber 215 or the fibers in the optical branches downstream the optical splitters be damaged or broken (an event that is not very unlikely, especially when the electric power distribution networks are placed in underground tunnels shared by different distribution systems, like telephone networks, gas and the like, thus people unskilled in this specific field may have access), with the consequence that the operation of the monitoring system is compromised. Using an OTDR or a COTDR apparatus allows assessing the optical fiber integrity and, in case of break, to identify the position of the break. It is pointed out that in principle this OTDR or COTDR apparatus used to monitor the integrity of the monitoring system may be distinct from the optical receiver 250 used to monitor the ancillary elements of the electric power distribution line, however it is preferable to use the same instrument for both purposes. In particular, optical radiations at different wavelengths may be used for monitoring the ancillary elements and the integrity of the monitoring system. For example, referring to FIG. 9 (which is a diagram with the attenuation α, units [dB], in ordinate, and the wavelength λ, units [nm], in abscissa), let it be assumed that evanescent-field VOAs are used for implementing the optical attenuators 235a, 235b, ..., 235k. The VOAs behaves as a temperature sensor that, at a selected first operating wavelength $\lambda_1$, e.g. approximately 1625 nm, stays "closed" (a condition, denoted C in the drawing, corresponding to a high attenuation, greater than a first attenuation value $\alpha_1$) as long as the external temperature is below approximately 50° C., and "opens" (i.e., its attenuation becomes lower than a second attenuation value $\alpha_2$ lower than the first attenuation value $\alpha_1$; in the drawing the open condition is denoted O) when the external temperature raises above approximately 60° C. Let it be assumed that the first operating wavelength $\lambda_1$, is used to monitor the operating condition of the SVLs. The integrity of the monitoring system can be monitored, even when the VOA is closed at the first wavelength $\lambda_1$, provided that an optical signal at a second wavelength $\lambda_2$, lower than the first wavelength, is used (e.g., approximately 1310 nm), at which the VOA exhibits a relatively low attenuation, below the second attenuation value $\alpha_2$, even at low external temperatures (as low as 5° C., in the example shown in the drawing). Thus, even when the VOA does not allow the optical radiation at the first wavelength to pass and reach the reflector 240a, 240b, . . . , 240k, the optical radiation at the second wavelength passes, reaches the reflector 240a, 240b, . . . , 240k, is reflected back, and thus the OTDR detects peaks in the back-reflected optical radiation at the second wavelength in positions corresponding to the ancillary elements, and this provides an indication of the system integrity; when instead one or more of said peaks are not detected, this means that the system integrity has been compromised.

Typically, in an electric power distribution network, three cables run in parallel, for trans-porting the three electrical phases; thus, at more or less regularly spaced locations along the cables, clusters of three ancillary elements such as SVLs are provided, relatively close to each other, for example enclosed in a box. Three monitoring systems of the type shown in FIG. 2 could in principle be used to monitor the SVL of each of the three cables; however, it is possible to use a single monitoring system, with a single central monitoring unit 220 and a single optical fiber 215 running along the electric power distribution line. A common optical branch with an optical splitter 225a, 225b, . . . , 225k, an optical attenuator 235a, 235b, . . . , 235k and a reflector 240a, 240b, . . . , 240k may be associated to every cluster of SVLs, in such a way that the optical shutter is sensible to the operating condition of any one of the three SVLs of the cluster. In this way it is however not possible to discern which SVL in a cluster sustained a discharge or is broken. As an alternative, a single central monitoring unit may be used, and the three optical fibers running along the three cables be coupled together by a coupler. As a further alternative, a single optical fiber can be used, and different optical branches (i.e., different optical splitters, optical attenuators and reflectors) may be provided for each SVL in a cluster; this allows monitoring the SVLs of the cluster individually; should the physical distance of the SVLs in a cluster (normally of some meters) not be sufficient for the OTDR or COTDR apparatus to discern, fiber spools of different length may be provided in the optical branches to vary the positions of the peaks in the back-reflected optical radiation intensity detected by the OTDR or COTDR apparatus.

Thanks to the present invention, it is possible to monitor the operating condition of ancillary elements spread along an electric power distribution line, and identify which ancillary element is sensing a physical event on the cable or is broken or near to be broken; the operation of maintenance of the electric power distribution network are thus performed when they are really necessary, and in a more efficient way, so any possible service interruption is reduced in time and frequency. Furthermore, the present invention may even be used to set up a preventive maintenance schedule, aimed at replacing or restoring the ancillary elements before they actually break, when they approach the average maximum operating life.

The monitoring system of the present invention is completely passive, can be activated by a physical phenomenon generated by, for example, a surge or fault or disturbance, with no need of other external energy feed such as batteries or the like.

The centralized character of the central monitoring unit, that can be located remotely from the electric power distribution line, i.e. not on the field, makes the maintenance of the optical source easy.

The present invention has been here described considering some exemplary embodiments thereof, however those skilled in the art will appreciate that several modifications to the described embodiments, as well as different embodiments of the invention are possible, for example in order to meet contingent needs.

For example, although reference has always been made to the monitoring of SVLs, the present invention has more general applicability, and can be used to monitor any ancillary component of an electric power distribution line, like for example cable joints.

The monitoring system of the invention can make use of any suitable kind of optical fiber, for example, polymeric, polymer-cladded, single mode or multimode. The selection of a specific type of optical fiber can be made by the skilled in the art on the basis of the specific application.

The invention claimed is:

1. A system for monitoring ancillary elements of an electric power distribution network, comprising:
   at least one optical fiber path;
   at least one optical branch branching from the optical fiber path, operatively associated with a respective ancillary element, each optical branch comprising:
      at least one passive optical attenuator operatively coupled with the respective ancillary element, and having an attenuation adapted to change in response to a change in operating conditions of the respective ancillary element; and
      an optical reflector;
   an optical radiation source capable of being adapted to inject optical radiation into the optical fiber path; and
   an optical receiver capable of being adapted to detect back-reflected optical radiation reflected by said optical reflector;
   said system capable of being adapted to recognize a position of at least one of the ancillary elements based on a characteristic of the back-reflected optical radiation.

2. The system of claim 1, wherein said monitoring system recognizes the position of at least one of the ancillary elements by the optical receiver.

3. The system of claim 1, wherein characteristics of the back reflected optical radiation comprise a variation in time of the intensity of the back-reflected optical radiation, a frequency at which the intensity of the back-reflected optical radiation switches among at least two different values, a spectrum of the back-reflected optical radiation, a propagation delay of the back-reflected optical radiation to reach the optical receiver, and a polarization state of the back-reflected optical radiation.

4. The system of claim 1, wherein said ancillary elements comprise at least one element selected from the group of surge voltage limiters, thermometers, and pressure monitors.

5. The system of claim 1, wherein said passive optical attenuator is responsive to a current following through the ancillary element.

6. The system of claim 5, wherein said passive optical attenuator comprises a latching-type optical switch, and attenuation value is capable of being adapted to switch between said first and second attenuation values each time the ancillary element is involved in a discharge.

7. The system of claim 6, wherein the attenuation of the passive optical attenuator is capable of being adapted to repeatedly switch between said first and second attenuation values when the ancillary element conducts a current for a prolonged time.

8. The system of claim 1, wherein said passive optical attenuator is thermally coupled to the respective ancillary element.

9. The system of claim 8, wherein said passive optical attenuator has an attenuation varying with temperature in such a way that a temperature increase caused by current flowing through the ancillary element causes a change in the attenuation value.

10. The system of claim 1, wherein a fraction of the optical radiation that is spilled by each optical branch varies monotonically along the optical fiber path.

11. A method of monitoring ancillary elements of an electric power distribution network, comprising:
associating the electric power distribution network to at least one optical fiber path;
associating the ancillary elements to be monitored by respective optical branches branching from the optical fiber path;
operatively coupling at least one passive optical attenuator to each one of the ancillary elements, the passive optical attenuator being part of the optical branch associated with the respective ancillary element;
propagating optical radiation into the optical fiber path;
responsive to a change in operating condition of at least one of the ancillary elements, causing a spilled optical radiation propagating through at least one of the optical branches to be back-reflected;
detecting the back-reflected optical radiation; and
recognizing a position, along the electric power distribution network, of said at least one of the ancillary elements based on a characteristic of the detected back-reflected optical radiation.

12. The method of claim 11, wherein said characteristics of the back reflected optical radiation comprise a variation in time of the intensity of the back-reflected optical radiation, a frequency at which the intensity of the back-reflected optical radiation switches among at least two different values, a spectrum of the back-reflected optical radiation, a time interval necessary for the back-reflected optical radiation to reach the optical receiver, and a polarization state of the back-reflected optical radiation.

13. The method of claim 11, wherein said at least one passive optical attenuator has an attenuation variable between at least one first higher value and one second lower value responsive to operating conditions of at least one of the components to be monitored.

14. The method of claim 11, wherein each of the optical branches comprises a reflector downstream the passive optical attenuator.

15. The method of claim 11, wherein said ancillary elements to be monitored comprise at least one element selected from the group of surge voltage limiters, thermometers, and pressure monitors.

16. The method of claim 15, wherein said passive optical attenuator is responsive to a current flowing through the ancillary element operatively coupled thereto.

17. The method of claim 16, wherein said passive optical attenuator comprises a latching-type optical switch, and the attenuation value is capable of being adapted to switch between said first and second attenuation values each time the ancillary element operatively associated therewith is involved in a discharge.

18. The method of claim 17, wherein the passive optical attenuator has an attenuation value that is capable of being adapted to repeatedly switch between said first and second attenuation values when the ancillary element associated therewith conducts a current for a prolonged time.

19. The method of claim 11, wherein said operatively coupling comprises thermally coupling.

20. The method of claim 19, wherein said passive optical attenuator has an attenuation varying with temperature in such a way that a temperature increase caused by current flowing through the ancillary element operatively associated therewith causes a change in the attenuation value.

21. The method of claim 11, wherein a fraction of the optical radiation that is spilled by each optical branch varies monotonically along the optical fiber path.

* * * * *